United States Patent Office 3,527,659
Patented Sept. 8, 1970

3,527,659
DIMETHYLPOLYSILOXANES AND COPOLYMERS CONTAINING SiO₂ UNITS AS RELEASE AGENT
Joseph W. Keil, Midland, Mich., assignor to Dow Corning Corporation, Midland, Mich., a corporation of Michigan
No Drawing. Filed June 13, 1966, Ser. No. 556,919
Int. Cl. C88g $47/00$
U.S. Cl. 117—145      6 Claims

ABSTRACT OF THE DISCLOSURE

A release agent for substrates consisting of:

(1) a dimethylpolysiloxane-based formulation which is curable to an elastomer and
(2) a copolymer of $R_3SiO_{.5}$ and $SiO_2$ units, the copolymer having no more than 0.7 weight percent silicon-bonded hydroxyl groups, are being a monovalent hydrocarbon radical of no more than 2 carbon atoms, illustrative of copolymer (2) is $(CH_3)_3SiO_{.5}$ units and $SiO_2$ units having 0.6 weight percent silicon-bonded hydroxyl groups.

---

This application relates to release agents for cellulosic materials and the like, which agents have intermediate-range release properties.

Cured dimethylpolysiloxane gums, such as those described in U.S. Pat. 3,061,567, are effective and well-known release agents for such uses as preventing asphalt from adhering to the paper container in which it is packed without migration of the silicone from the paper to the asphalt.

In many uses, however, it is possible for the release capability of a substrate to be too great. For example, pull-away backings for adhesive tapes must separate without difficulty from the adhesive which they protect, but they must not contain such effective release agents that they accidentally fall off or slide away. Such occurrences are possible with the presently-known silicone release agents.

An object of this invention is to provide silicone release agents with release capabilities which are less effective than the presently-known silicone release agents, and to provide a sequence of release agents which have varying release capabilities so that a release agent having precisely the desired release capabilities for most situations can be prepared. Another object is to provide release films in which the release capability is essentially constant with time.

The release agents of this invention provide intermediate range release values, effectively eliminating the disadvantage cited above, while still providing easy release.

To illustrate, when a 1 inch wide strip of adhesive tape is affixed to stiff paper treated with the release agent of U.S. Pat. 3,061,567, a pull of about 10 to 40 grams parallel to the plane of the paper so as to pull the tape backwards off of the paper will remove the tape. This test is the Technical Association for the Pulp and Paper Industry Routine Control Test No. 283, known as the Keil test.

When the same experiment is repeated using the release agent of this invention, a pull of from about 40 to 550 grams is required, depending on how the release has been formulated.

For untreated paper, a pull of well over 550 grams is required.

This application relates to an intermediate range release agent consisting essentially of (a) 100 parts by weight of a dimethylpolysiloxane-based formulation which is curable to an elastomer and (b) from 0.5 to 45 parts by weight of a toluene-soluble copolymer of (1) $R_3SiO_{1/2}$ units and (2) $SiO_{4/2}$ units, the ratio of said (1) units to (2) units being from 0.6:1 to 1.1:1, and the silicon-bonded hydroxyl content of (b) being no more than 0.7 weight percent, based on the weight of (b), where R is a monovalent hydrocarbon radical of no more than 2 carbon atoms.

By "dimethylpolysiloxane-based formulation which is curable to an elastomer" it is meant any silicone elastomer stock where the major ingredient is dimethylpolysiloxane.

Many techniques of curing dimethylpolysiloxane to an elastomer are known to the art, and a detailed discussion of their preparation is therefore unnecessary. Examples of some of the better-known techniques are shown below:

(a)
$$(CH_3\overset{O}{\overset{\|}{C}}O)_2SiO\left[\underset{CH_3}{\overset{CH_3}{\underset{|}{\overset{|}{Si}}O}}\right]_{200}\!\!-\!\!Si(O\,C\overset{O}{\overset{\|}{C}}H_3)_2$$

which cures on exposure to moisture.

(b)
$$HO\left[\underset{CH_3}{\overset{CH_3}{\underset{|}{\overset{|}{Si}}O}}\right]_{400}\!\!H$$

plus ethylpolysilicate or methyltrimethoxysilane as a crosslinking agent. Cures on heating or in the presence of condensation catalysts such as dibutyltindilaurate or sodium phenoxide.

(c)
$$CH_2=CH\overset{CH_3}{\underset{\phi}{\overset{|}{Si}}}O\left(\underset{CH_3}{\overset{CH_3}{\underset{|}{\overset{|}{Si}}O}}\right)_{300}\!\!\overset{CH_3}{\underset{\phi}{\overset{|}{Si}}}CH=CH_2$$

plus ditertiary-butyl peroxide as a curing catalyst. Cures on heating in an oxygen-free atmosphere.

(d)
$$CH_2=CH\overset{CH_3}{\underset{CH_3}{\overset{|}{Si}}}O\left(\underset{CH_3}{\overset{CH_3}{\underset{|}{\overset{|}{Si}}O}}\right)_{400}\!\!\left[\underset{\underset{CH_2}{\overset{|}{CH}}}{\overset{CH_3}{\underset{|}{\overset{|}{Si}}O}}\right]\overset{CH_3}{\underset{CH_3}{\overset{|}{Si}}}CH=CO_2\;\; plus\;\;\left(\underset{H}{\overset{CH_3}{\underset{|}{\overset{|}{Si}}O}}\right)_5$$

in the presence of a trace of chloroplatinic acid. Cures on heating.

It can therefore be seen that the method of cross-linking the dimethylpolysiloxane elastomers of this invention is not critical.

The preferred ingredient (a) is a mixture of a dimethylpolysiloxane fluid containing an average of at least two silanol groups per molecule and having a viscosity of at least 1000 cs. at 25° C., mixed with sufficient methylhydrogenpolysiloxane and sufficient condensation catalyst to render (a) curable to an elastomer on heating.

Silica or other fillers can be added to the elastomer stock if desired, as well as stabilizers, crosslinkers, catalysts, and other known elastomer additives.

R, defined above, can be any monovalent hydrocarbon of no more than two carbon atoms, i.e., methyl, ethyl, vinyl, or ethynyl. Methyl is preferred.

The precursor to ingredient (b) can be prepared in accordance with the disclosures of U.S. Pat. 2,676,182. As is implied therein, an excess of $R_3SiO_{1/2}$ units must generally be added to the reaction mixture in order to obtain the desired benzene-soluble product having the requisite ratio of $R_3SiO_{1/2}$ units. The product will generally have a silicon-bonded hydroxyl content of about 2 to 3 weight percent or higher.

This precursor can then be reacted with a silanol-reactive, triorganosilylated "capping" agent which is non-reactive with the siloxane linkage. The preferred such agent is a silazane of the formula $(R_3Si)_2NH$ or $R_3SiNH_2$, e.g., hexamethyldisilazane or dimethylvinylsilylamine, where R is defined above. This agent can simply be added to the precursor, where it replaces $\equiv SiOH$ groups with $\equiv SiOSiR_3$ groups, yielding ammonia as a byproduct.

It is preferred for the silicon-bonded hydroxyl content of ingredient (b) to be no more than 0.3 weight percent. It is generally preferred to minimize the hydroxyl content, as the effectiveness of ingredient (b) as a release inhibitor appears to be increased when its silanol content is at a minimum, thus permitting the use of less ingredient (b) for any given release value desired.

It is often desirable for a silanol condensation catalyst to be present in those compositions of this invention which are cured by the condensation of silanol groups with themselves or with hydrolyzable groups such as silicon-bonded hydrogen or alkoxide groups, e.g. methoxide. Many such catalysts are known to the art.

Desirable catalyst are primary, secondary, and tertiary amines, preferably having a dissociation constant of at least $10^{-10}$, such as sec-butylamine, hydrazine, t-octylamine, dimethylaminomethylphenol, ethylenediamine, quinine, arginine, o-methoxybenzylamine, triethylamine, aniline, and pyridine.

Also operative as catalysts are the condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, alpha, beta-dimethylacrolein and amylamine, butyraldehyde and butylamine, acrolein and allylamine, and formaldehyde and heptylamine.

Another class of catalyst for the reaction is the carboxylic acid salts of metals higher than hydrogen in the electromotive force series of metals. Specific examples of the metals that can be used are lead, tin, nickel, cobalt, iron, cadmium, chromium, zinc, manganese, aluminum, magnesium, barium, strontium, calcium, cesium, rubidium, potassium, sodium and lithium. Specific examples of these salts are the naphthenates of the above metals such as lead naphthenate, cobalt naphthenate and zinc naphthenate; salts of fatty acids such as iron 2-ethylhexoate, stannous 2-ethylhexoate, potassium acetate, chromium octoate; salts of polycarboxylic acids such as dibutyltin adipate and lead sebacate; and salts of hydroxy carboxylic acids such as dibutyltin dilactate.

The titanate esters, e.g. tertrabutyl titanate, and derivatives thereof are also operative in this invention, although they have been found to affect the release properties of the compositions to which they are added. They are, therefore, not preferred.

Buffered alkali catalysts such as sodium or potassium phenoxide also operate in this invention.

A normal catalytic amount of silanol condensation catalyst is used in this invention. This is frequently from 0.1 to 4 weight percent of catalyst, based on the weight of the other ingredients, but the range of catalyst concentration is not critical.

The release agents of this application are usually applied as a 3 to 20 weight percent dispersion in a volatile dispersing agent such as water, or preferably in a solvent such as xylene, toluene, 1,1,1-trichloroethane, heptane, dibutylether, methylisobutylketone, isopropanol, chlorobenzene, or trifluorotrichloroethane.

The release agents can be made to have the desired release capability simply by adding a given amount of ingredient (b) to ingredient (a). Some forms of ingredient (a) are commercially available. Less release is obtained as more ingredient (b) is added. The most useful release values are generally obtained when from 1 to 10 parts of ingredient (b) are added to every 100 parts of ingredient (a).

The release agents are cured in a manner that varies with the nature of the particular curing mechanism used, and acceptable curing conditions can be easily determined by those who are skilled in the art.

The preferred release agents of this invention are generally heated for one through ten minutes at about 220° through 400° F. after they have been applied as a thin film to the substrate on which they are to reside.

The release agents of this invention can be used on any substrate, e.g., glass, stone, plastic, rubber, metal, wood, and paper. They will give release against virtually all adhesives and sticky materials such as tar, pitch, raw rubber, and synthetic pressure sensitive adhesives.

It is preferred to use the compositions of this invention on substrates which are cellulosic sheets, e.g., corrugated paper, kraft paper, calendared kraft paper, glassine, parchment, cellulose acetate sheets, wrapping paper, and cotton fabric.

If desired, primers such as methyltriacetoxysilane,

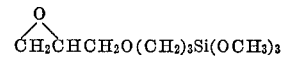

or mixtures thereof can be added to the substrate before applying the release agent of this invention in order to increase the adhesion of the release agent to the substrate.

The following examples are illustrative only and should not be construed as limiting the invention, which is properly delineated in the appended claims.

EXAMPLE 1

The following compositions were prepared:

Composition A.—29 parts by weight of (1) a hydroxyl-endblocked dimethylpolysiloxane gum having a viscosity at 25° C. of about 20,000,000 cps., (2) 1 part of a composition of the formula

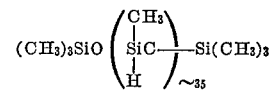

and (3) about 0.5 part of dibutyltin di-2-ethylhexoate plus about 0.3 part of silica powder.

Composition B.—A toluene-soluble copolymer of 0.9 molar part of trimethylsiloxane units and 1 molar part of $SiO_{4/2}$ units, having a silicon-bonded hydroxyl content of 2 to 3 weight percent.

Composition C.—The above toluene-soluble copolymer which has been reacted with sufficient hexamethyldisilazane to lower its silicon-bonded hydroxyl content to 0.13 weight percent.

Toluene dispersions of curable release agents made from the above, and containing 10 weight percent of release agent, were drawn with a Meyer rod onto glassine paper and cured for 2 minutes at 250° F.

The following tests were then performed with Johnson and Johnson surgical tape of one inch width.

Quick tack test.—The tape was gently placed on the coated paper. The force required in grams to remove the tape by pulling it at approximately a 180° angle was measured.

Release test.—The tape was placed on the coated paper and pressed with a pressure of ¼ lb. per square inch. After aging for 20 hours at 70° C., the force required in grams to remove the tape by pulling it at approximately a 180° angle was measured.

Subsequent adhesion test.—The tape used in the previous test was placed on a clean steel panel. The force required in grams to remove the tape was measured as above. This test measures the degree that the release coating affected the tape.

The curable release agents tested and the test results are shown below for both the freshly cured coated paper and for coated paper which has been further aged for 7 days at 70° C.

| Curable release agent | Freshly coated paper | | | Paper aged 7 days at 70° C. | | |
|---|---|---|---|---|---|---|
| | Quick tack (g.) | Release (g.) | Subseq. adhesion (g.) | Quick tack (g.) | Release (g.) | Subseq. adhesion (g.) |
| (a) Composition A | 0 | 40 | 315 | 0 | 15 | 380 |
| (b) 9 g. of ingredient (1) of composition A. 10 drops of ingredient (2). 20 drops of 50% toluene solution of dibutyltindioctoate, plus a trace of silica powder. 1 g. of composition B | 20 | 280 | 480 | 0 | 60 | 530 |
| (c) Same as (b) with substitution of composition C for composition B | 100 | 400 | 380 | 70 | 380 | 460 |
| (d) 7 g. of ingredient (1) of composition A. 10 drops of composition A. 10 drops of ingredient (2). 20 drops of 50% toluene solution of dibutyltindioctoate, plus a trace of silica powder. 3 g. of composition B | 160 | 500 | 350 | 40 | 290 | 450 |
| (e) Same as (d) with substitution of composition C for composition B | 260 | 550 | 420 | 200 | 480 | 480 |

Curable release agents (c) and (e) are within the scope of this invention. The others are included for comparison.

EXAMPLE 2

Toluene solutions containing 5 weight percent of the following release agents were cured on glassine paper and tested as in Example 1, both immediately after cure and after 7 days of aging at 70° C.:

| Release agent | Release test on freshly coated paper (g.) | Release test on aged paper (g.) |
|---|---|---|
| (a) 10 g. of ingredient (1) of composition A. 10 drops of ingredient (2) of composition A. 20 drops of 50% toluene solution of dibutyltin di-2-ethylhexoate, plus a trace of silica powder. 0.2 g. of composition C | 114 | 108 |
| (b) The same as above, but containing 0.4 g. of composition C | 160 | 170 |
| (c) The same as above, but containing 0.6 g. of composition C | 169 | 197 |
| (d) The same as above, but containing 0.8 g. of composition C | 183 | 217 |
| (e) The same as above, but containing in place of composition C, 0.67 g. of a composition similiar to composition C but having a silicon-bonded hydroxyl content of less than 0.17 weight percent | 37 | 42 |
| (f) The same as (e) but containing 0.13 g. of the composition C used therein | 60 | 55 |
| (g) The same as (a), but containing in place of composition C, 0.2 g. of a composition similiar to composition C but having a silicon-bonded hydroxyl content of 0.6 percent | 80 | 87 |
| (h) The same as (g), but containing 0.8 g. of the composition similiar to composition C used therein | 188 | 206 |

EXAMPLE 3

When a 15 weight percent dispersion of the following in methylisobutylketone is applied to plywood and allowed to cure by exposing it to the air at room temperature for 48 hours, the coated plywood exhibits a moderate release capability from asphalt which is applied to the plywood in the molten form and allowed to harden:

100 parts of

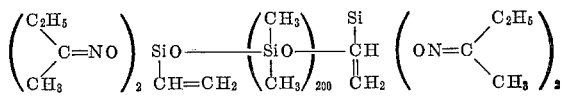

12 parts of a toluene-soluble copolymer of 0.7 molar parts of

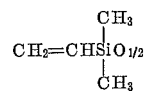

units and 1 molar part of $SiO_{4/2}$ units, having a silicon-bonded hydroxyl content of 0.3 weight percent, and 15 parts of fume silica rendered hydrophobic by treatment with hexamethylcyclotrisiloxane and ammonia.

EXAMPLE 4

Equivalent results to those of Example 1 are obtained when the dimethylpolysiloxane gum of composition A is replaced with a hydroxyl-endblocked dimethylpolysiloxane fluid having a viscosity at 25° C. of 5000 cs.

That which is claimed is:
1. A substrate selected from the group consisting of glass, stone, plastic, rubber, metal and cellulosic materials; said substrate being coated with a release agent consisting essentially of (a) 100 parts by weight of a dimethylpolysiloxane-based formulation which is curable to an elastomer and (b) from 0.5 to 45 parts by weight of a toluene-soluble copolymer of (1) $R_3SiO_{1/2}$ units and (2) $SiO_{4/2}$ units, the ratio of said (1) units to (2) units being from 0.6:1 to 1.1:1, and the silicon-bonded hydroxyl content of (b) being no more than 0.7 weight percent, based on the weight of (b), where R is a monovalent hydrocarbon radical of no more than 2 carbon atoms.
2. The substrate of claim 1 wherein the R is the release agent in a methyl radical.
3. The substrate of claim 1 wherein the release agent is cured.
4. The substrate of claim 1 wherein the release agent consists essentially of (a) 100 parts by weight of a mixture of a dimethylpolysiloxane fluid containing an average of at least two silanol groups per molecule and having a viscosity of at least 1000 cs. at 25° C., mixed with sufficient methylhydrogenpolysiloxane and sufficient condensation catalyst to render (a) curable to an elastomer on heating, and (b) from 0.5 to 30 parts by weight of a toluene-soluble copolymer of (1) $R_3SiO_{1/2}$ units and (2) $SiO_{4/2}$ units, the ratio of said (1) units to (2) units being from 0.6:1 to 1.1:1, and the silicon-bonded hydroxyl content of (b) being no more than 0.7 weight percent of (b), where R is a monovalent hydrocarbon radical of no more than 2 carbon atoms.
5. The substrate of claim 4 wherein the release agent, the silicon-bonded hydroxyl content of (b) is no more than 0.3 weight percent.
6. The article of claim 4 wherein the substrate is a cellulosic material.

References Cited

UNITED STATES PATENTS

| 2,814,601 | 11/1957 | Currie | 260—825 |
| 2,857,356 | 10/1958 | Goodwin | 260—825 |
| 2,970,126 | 1/1961 | Brown | 260—825 |
| 2,979,479 | 4/1961 | Modic | 260—825 |
| 2,985,544 | 5/1961 | Monterey | 260—825 |
| 2,985,546 | 5/1961 | Leavitt | 260—825 |
| 3,004,871 | 10/1961 | Leavitt | 260—825 |
| 3,017,384 | 1/1962 | Modic | 260—825 |
| 3,057,469 | 10/1962 | Bond | 260—825 |
| 3,070,566 | 12/1962 | Nitzsche | 260—825 |
| 3,127,363 | 3/1964 | Nitzsche | 260—825 |
| 3,205,283 | 9/1965 | Modic | 260—825 |
| 2,811,408 | 10/1957 | Braley | 18—47 |
| 3,300,542 | 1/1967 | Hadlock | 260—825 |
| 3,328,482 | 6/1967 | Northrup | 260—825 |

PAUL LIEBERMAN, Primary Examiner

U.S. Cl. X.R.

117—123, 124, 132, 135.1, 138.8, 139, 143, 155, 161; 260—46.5, 825